Patented Oct. 2, 1934

1,975,361

UNITED STATES PATENT OFFICE 1,975,361

PROCESS FOR THE REMOVAL OF RESIDUAL POISONS FROM FRUITS AND VEGETABLES

Arthur M. Henry, Haddonfield, N. J., assignor to the Government and People of the United States of America No Drawing. Application April 19, 1928, Serial No. 271,394

7 Claims. (Cl. 146—219)

(Granted under the act of March 3, 1883, as amended April 30, 1928; 370 O. G. 757)

This application is made under the act of March 3, 1883, Chapter 143 (22 Stat. 625), and the invention herein described and claimed may be used by the Government of the United States or any of its officers or employees in the prosecution of work for the Government, or by any citizen of the United States, without payment to me of any royalty thereon.

My invention relates to the employment of certain alkalies or mixtures of such alkalies for the removal of spray residues and other deleterious matter from fruits and vegetables.

It is a well known fact in the fruit and vegetable industries that, in the protection of growing fruit and vegetables from insects and fungi and the diseases to which fruit and vegetables are subject, it is necessary to spray the same including the fruit trees and the vegetable plants with arsenicals and other insecticides and fungicides. The poisonous spray materials adhere to the surface of the fruits and the vegetables and if not removed prior to the marketing and the consumption of the same injuriously affect the consumer.

I have found that arsenical spray residues may be removed from fruits and vegetables by subjecting the same to immersion in or a spray of alkalies or mixtures thereof, such as ammonium hydroxide, sodium hydroxide, sodium carbonate, sodium bicarbonate. The alkalies are diluted with water to any desired extent prior to their application to the fruit or vegetables. The spray or immersion above referred to should be continued or maintained for a sufficient length of time to bring about a substantially complete removal of the poisonous residues on the fruits and vegetables. While I do not wish to limit myself to any specific proportions of alkalies and water, the concentration that I have found most desirable for the purpose is a one per cent alkali solution, or stated otherwise, 1 part by weight of alkali and 99 parts by weight of water. It is to be understood that the alkali may be diluted with water to any desired degree so long as the effective action of the alkali upon the residual poison is not interfered with and the proportions of water and alkali may of course be varied under these conditions within wide ranges.

After subjection of the fruits or vegetables to the action of the alkali spray or immersion above mentioned, the alkali is removed by a water bath or spray. Upon completion of the washing operation, which is continued of course for a sufficient length of time to effect the complete removal of the alkali, the moisture contained on the surface of the fruit or vegetables is gotten rid of to any desired extent by natural or artificial means; the fruits and vegetables are then ready for the market.

Several examples of the practical operation of my process are set forth below:

*Example 1.*—Arsenical spray residue was removed from grapes by the application thereto of a single wash of a one per cent solution of ammonia.

*Example 2.*—Arsenical spray residue was removed from grapes by the application thereto of a single wash of a one per cent solution of sodium hydroxide.

*Example 3.*—Arsenical spray residue was removed from apples by washing the same with a one per cent solution of ammonia followed by rinsing in fresh water whereby the ammonia was gotten rid of and the apples were then dried. The same process was employed, using sodium hydroxide instead of ammonia, and similar results were obtained as in the operation of the process with ammonia.

*Example 4.*—Arsenic coated pears were treated with a wash of dilute sodium hydroxide and the arsenic thereby removed.

It is to be understood that in all of the above examples the alkali treatment was followed by washing with water and subsequent drying.

I claim:

1. A process for the removal of residual poisons from fruits and vegetables comprising the subjection of such articles to a dilute solution of an alkali.

2. A process for the removal of residual poisons from fruits and vegetables comprising the subjection of such articles to a dilute solution of an alkali, then removing the alkali by washing such articles in water, and subsequently freeing such articles from moisture.

3. In the preparation for market of apples, pears, or other fresh fruit carrying a surface deposit of an arsenical compound, the process which comprises removing such deposit from the fruit by applying thereto a solution comprising a free alkali and then treating said fruit to remove free alkali therefrom.

4. In the preparation for market of apples, pears, or other fresh fruit carrying an adherent deposit of a toxic metal compound insecticide, the process which comprises washing such fruit with an alkaline solution until the amount of said deposit is reduced below a predetermined allowable limit.

5. In the preparation for market of apples, pears and other fruit carrying an adherent surface deposit of an arsenical compound, the process which comprises subjecting the fruit for several minutes to the action of a solution containing a caustic alkali and an alkali-metal salt in sufficient concentration to dissolve or loosen said deposit, and then treating the fruit to remove free alkali therefrom.

6. In the preparation for market of apples, pears, and other fruit carrying an adherent surface deposit of an arsenical compound, the process which comprises subjecting the fruit for several minutes to the action of a solution containing a caustic alkali in sufficient concentration to dissolve or loosen said deposit, and then treating the fruit to remove free alkali therefrom.

7. In the preparation for market of fresh fruit such as apples and pears, of which the skin carries a deposit of toxic insecticidal material, the process which comprises subjecting the fruit to the action of a solution containing an alkali-metal salt having an alkaline reaction in sufficient concentration to dissolve or loosen said deposit, and then treating the fruit to remove said salt therefrom.

ARTHUR M. HENRY.